United States Patent
Wang et al.

(10) Patent No.: US 8,250,653 B2
(45) Date of Patent: Aug. 21, 2012

(54) SECURE MULTI-PRINCIPAL WEB BROWSER

(75) Inventors: Jiahe Helen Wang, Redmond, WA (US);
Barend H. Venter, Issaquah, WA (US);
Christopher L. Grier, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 606 days.

(21) Appl. No.: 12/433,788

(22) Filed: Apr. 30, 2009

(65) Prior Publication Data
US 2010/0281537 A1    Nov. 4, 2010

(51) Int. Cl.
*G06F 21/00*    (2006.01)
(52) U.S. Cl. ........... 726/22; 726/11; 726/12; 726/13; 713/164
(58) Field of Classification Search .............. None
See application file for complete search history.

(56) References Cited

U.S. PATENT DOCUMENTS

| | | | |
|---|---|---|---|
| 7,155,490 B1 | 12/2006 | Malmer et al. | |
| 2003/0028655 A1* | 2/2003 | Owhadi | 709/229 |
| 2003/0229900 A1* | 12/2003 | Reisman | 725/87 |
| 2005/0177753 A1 | 8/2005 | Carpenter | |
| 2005/0278793 A1* | 12/2005 | Raley et al. | 726/28 |
| 2006/0070066 A1* | 3/2006 | Grobman | 718/1 |
| 2006/0143437 A1* | 6/2006 | Narin | 713/152 |
| 2006/0259873 A1* | 11/2006 | Mister | 715/781 |
| 2007/0011179 A1 | 1/2007 | Paval | |
| 2007/0136579 A1* | 6/2007 | Levy et al. | 713/168 |
| 2007/0136685 A1* | 6/2007 | Bhatla et al. | 715/800 |
| 2007/0240212 A1* | 10/2007 | Matalytski | 726/22 |
| 2008/0244168 A1* | 10/2008 | Warrier et al. | 711/105 |
| 2008/0313648 A1 | 12/2008 | Wang et al. | |
| 2009/0007152 A1 | 1/2009 | Cahill et al. | |
| 2009/0077124 A1 | 3/2009 | Spivack et al. | |
| 2009/0106456 A1 | 4/2009 | Muller et al. | |
| 2009/0187763 A1* | 7/2009 | Freericks et al. | 713/167 |

FOREIGN PATENT DOCUMENTS

WO    WO2008111049 A2    9/2008

OTHER PUBLICATIONS

"Adobe Flash Player Multiple Vulnerabilities", retrieved on Jun. 23, 2009 at <<http://secunia.com/advisories/26027/>>, Secunia Advisories, Secunia, pp. 1-2.

Ajwani, et al., "Characterizing the Performance of Flash Memory Storage Devices and its Impact on Algorithm Design", retrieved on Jun. 23, 2009 at <<http://domino.mpi-inf.mpg.de/internet/reports.nsf/c125634c000710cd80255ef200387b6e/97ad4f8726d86917c12573db004b6348/$FILE/MPI-I-2008-1-001.pdf>>, Jan. 2008, 3 title pages and pp. 1-33.

(Continued)

*Primary Examiner* — Jung Kim
*Assistant Examiner* — Adrian Stoica
(74) *Attorney, Agent, or Firm* — Lee & Hayes, PLLC

(57) ABSTRACT

A web browser operating system using a browser kernel places principals having different origins in separate principal instances, where each separate principal instance executes in a separate protection domain. Principal origin may be determined using the combination of protocol, domain name, and port. The browser kernel mediates communications between principal instances, and between the principal instances and the operating system. Within each principal instance, a browser runtime executes as a restricted operating system process (ROSP), while any plugins are executed as a separate ROSP. Renderings from each browser runtime are combined by the browser kernel for presentation to a user.

20 Claims, 7 Drawing Sheets

OTHER PUBLICATIONS

Anderson, "Computer Security Technology Planning Study", retrieved on Jun. 23, 2009 at <<http://csrc.nist.gov/publications/history/ande72.pdf>>, Oct. 1972, 142 pgs.

Banga, et al., "Resource Containers: A New Facility for Resource Management in Server Systems", retrieved on Jun. 23, 2009 at <<http://www.usenix.org/events/osdi99/full_papers/banga/banga.pdf>>, Proceedings of the 3rd Symposium on Operating Systems Design and Implementation, Feb. 1999, 15 pgs.

Barth, et al., "The Security Architecture of the Chromium Browser", retrieved on Jun. 23, 2009 at <<http://crypto.stanford.edu/websec/chromium/chromium-security-architecture.pdf>>, WWW2009, Apr. 2009, pp. 1-10.

"Capability-Based Computer Systems", retrieved on Jun. 23, 2009 at <<http://www.cs.washington.edu/homes/levy/capabook/Chapter1.pdf>>, pp. 1-18.

"CFS Group Scheduling", retrieved on Jun. 22, 2009 at <<http://lwn.net/Articles/240474/>>, 3 pgs.

Chase, et al., "Sharing and Protection in a Single Address Space Operating System", retrieved on Jun. 23, 2009 at <<http://citeseerx.ist.psu.edu/viewdoc/download;jsessionid=42A05FEE8FC92B18023309645C58BF9E?doi=10.1.1.52.4172&rep=rep1&type=pdf>>, Technical Report 93-04-02, Department of Computer Science and Engineering, University of Washington, Apr. 1993, revised Jan. 1994, 3 title pages and pp. 1-33.

Chopra, "Browser-based Operating Systems", retrieved on Jun. 23, 2009 at <<http://pcquest.ciol.com/content/search/showarticle.asp?artid=94062>>, PCQuest, 2009, pp. 1-2.

Clark, et al., "An Architectural Overview of the Alpha Real-Time Distributed Kernel", retrieved on Jun. 23, 2009 at <<http://citeseerx.ist.psu.edu/viewdoc/download?doi=10.1.1.26.4422&rep=rep1&type=pdf>>, 21 pgs.

Czajkowski, et al., "JRes: A Resource Accounting Interface for Java", retrieved on Jun. 23, 2009 at <<http://citeseerx.ist.psu.edu/viewdoc/download?doi=10.1.1.57.2551&rep=rep1&typle=pdf>>, Proceedings of the 1998 ACM OOPSLA Conference, Oct. 1998, 15 pgs.

"Document Object Model (DOM)", retrieved on Jun. 23, 2009 at <<http://www.w3.org/dom/>>, W3C DOM IG, Jan. 19, 2005, pp. 1-3.

Douceur, et al., "Leveraging Legacy Code to Deploy Desktop Applications on the Web", retrieved on Jun. 23, 2009 at <<http://www.usenix.org/event/osdi08/tech/full_papers/douceur/douceur_html/index.html>>, Microsoft Research, pp. 1-21.

Eriksen, "Trickle: A Userland Bandwidth Shaper for Unix-like Systems", retrieved on Jun. 23, 2009 at <<http://www.monkey.org/~marius/trickle/trickle.pdf>>, 10 pgs.

Ford, et al., "Evolving Mach 3.0 to a Migrating Thread Model", retrieved on Jun. 23, 2009 at <<http://citeseerx.ist.psu.edu/viewdoc/download;jsessionid=51453CF2C070F6AD810C547DB4588DB9?doi=10.1.1.19.7348&rep=rep1&type=pdf>>, University of Utah, pp. 1-18.

"Gears Improving Your Web Browser", retrieved on Jun. 23, 2009 at <<http://gears.google.com/>>, Google, 2008, 1 pg.

"Geolocation API Specification", retrieved on Jun. 23, 2009 at <<http://dev.w3.org/geo/api/spec-source.html>>, W3, Jun. 8, 2009, pp. 1-6.

"Google Projects for Android", retrieved on Jun. 23, 2009 at <<http://code.google.com/android/>>, Google, pp. 1-3.

Goyal, et al., "A Hierarchical CPU Scheduler for Multimedia Operating Systems", retrieved on Jun. 23, 2009 at <<http://www.cs.virginia.edu/~zaher/classes/CS656/osdi96.pdf>>, Distributed Multimedia Computing Laboratory, Department of Computer Sciences, University of Texas, 15 pgs.

Grimshaw, et al., "Wide-Area Computing: Resource Sharing on a Large Scale", retrieved on Jun. 23, 2009 at <<http://www.cs.virginia.edu/papers/widearea.pdf>>, Computing Practices, IEEE, May 1999, pp. 29-37.

Hamilton, et al., "The Spring Nucleus: A Microkernel for Objects", retrieved on Jun. 23, 2009 at <<http://research.sun.com/techrep/1993/smli_tr-93-14.pdf>>, Sun Microsystems, Apr. 1993, pp. 1-15.

Harty, et al., "Application-Controlled Physical Memory using External Page-Cache Management", retrieved on Jun. 23, 2009 at <<http://www.cs.ucsb.edu/~ravenben/papers/coreos/HC92.pdf>>, Computer Science Department, Stanford University, 11 pgs.

Howell, et al., "MashupOS: Operating System Abstractions for Client Mashups", retrieved on Jun. 23, 2009 at <<http://www.usenix.org/event/hotos07/tech/full_papers/howell/howell_html/>>, pp. 1-11.

"HTML 5", retrieved on Jun. 23, 2009 at <<http://www.w3.org/html/wg/html5/>>, W3C, Jun. 17, 2009, pp. 1-191.

Hunt, et al., "Singularity: Rethinking the Software Stack", retrieved on Jun. 23, 2009 at <<http://reserach.microsoft.com/apps/pubs/?id=69431>>, Microsoft Research, Apr. 1, 2007, 1 pg.

Jim, et al., "Defeating Script Injection Attacks with Browser-Enforced Embedded Policies", retrieved on Jun. 23, 2009 at <<http://www2007.org/papers/paper595.pdf>>, WWW 2007, Track: Security, Privacy, Reliability, and Ethics, Session: Defending Against Emerging Threats, 2007, pp. 601-610.

Krueger, et al., "Tools for the Development of Application-Specific Virtual Memory Management", retrieved on Jun. 23, 2009 at <<http://citeseerx.ist.psu.edu/viewdoc/summary?doi=10.1.1.52.9000>>, Computer Science Division, University of California, Berkeley, 17 pgs.

McNamee, et al., "Extending the Mach External Pager Interface to Accommodate User-Level Page Replacement Policies", retrieved on Jun. 23, 2009 at <<http://citeseerx.ist.psu.edu/viewdoc/download?doi=10.1.1.54.1025&rep=rep1&type=pdf>>, Department of Computer Science and Engineering, University of Washington, pp. 1-9.

MemberWiki, "Mobile Device APIs Style Guide", retrieved on Jun. 23, 2009 at <<http://www.openajax.org/member/wiki/Mobile_Device_APIs_Style_Guide>>, Oct. 9, 2008, pp. 1-11.

Moshchuk, et al., "Flashproxy: Transparently Enabling Rich Web Content via Remote Execution", retrieved on Jun. 23, 2009 at <<http://www.cs.washington.edu/homes/gribble/papers/sys169-moshchuk.pdf>>, MobiSys 2008, ACM, 13 pgs.

"NetLimiter—Ultimate Bandwidth Shaper", retrieved on Jun. 23, 2009 at <<http://www.netlimiter.com/>>, Locktime Software, 2003-2008, 1 pg.

Petrou, et al., "Implementing Lottery Scheduling: Matching the Specializations in Traditional Schedulers", retrieved on Jun. 23, 2009 at <<http://www.usenix.org/events/usenix99/full_papers/petrou/petrou.pdf>>, Proceedings of the 1999 USENIX Annual Technical Conference, USENIX, 1999, 15 pgs.

Regehr, "Using Hierarchical Scheduling to Support Soft Real-Time Applications in General-Purpose Operating Systems", retrieved on Jun. 23, 2009 at <<http://citeseer.ist.psu.edu/cache/papers/cs/21991/http:zSzzSzwww.cs.utah.eduzSz~regehrzSzpaperszSzdisszSzregehr-diss-single.pdf/regehr01using.pdf>>, May 2001, pp. i-xii and 1-169.

Reis, et al., "Isolating Web Programs in Modem Browser Architectures", retrieved on Jun. 23, 2009 at <<http://www.cs.washington.edu/homes/gribble/papers/eurosys-2009.pdf>>, EuroSys 2009, ACM, 2009, 13 pgs.

Rizzo, "Dummynet: a simple approach to the evaluation of network protocols", retrieved on Jun. 23, 2009 at <<http://citeseerx.ist.psu.edu/viewdoc/download?doi=10.1.1.57.2969&rep=rep1&type=pdf>>, ACM Computer Communicaton Review, vol. 27, No. 1, Jan. 1997, pp. 31-41.

Saltzer, et al., "The Protection of Information in Computer Systems", retrieved on Jun. 23, 2009 at <<http://www.acsac.org/secshelf/papers/protection_information.pdf>>, 30 pgs.

"Same Origin Policy for JavaScript", retrieved on Jun. 23, 2009 at <<http://www.mozilla.org/projects/security/components/same-origin.html>>, Mozilla Developer Center, pp. 1-3.

Sharma, "What is the REAL speed of your 3G connection", retrieved on Jun. 23, 2009 at <<http://www.xtremelabs.com/blog>>, Xtreme Labs, Dec. 4, 2008, pp. 1-5.

Tanenbaum, et al., "Using Sparse Capabilities in a Distributed Operating System", retrieved on Jun. 23, 2009 at <<http://citeseerx.ist.psu.edu/viewdoc/download?doi=10.1.1.49.7998&rep=rep1&type=pdf>>, pp. 64-74.

"V8 JavaScript Engine", retrieved on Jun. 23, 2009 at <<http://code.google.com/p/v8/>>, Google Code, Google, 2009, pp. 1-2.

Vandat, et al., "WebOS: Operating System Services for Wide Area Applications", retrieved on Jun. 23, 2009 at <<http://ieeexplore.ieee.org/stamp/stamp.jsp?tp=&arnumber=709956&isnumber=15339>>, 12 pgs.

Waldspurger, et al., "Lottery Scheduling: Flexible Proportional-Share Resource Management", retrieved on Jun. 23, 2009 at <<http://www.usenix.org/publications/library/proceedings/osdi/full_papers/waldspurger.pdf>>, MIT Laboratory for Computer Science, 11 pgs.

Wallach, et al., "Extensible Security Architectures for Java", 16th Symposium on Operating Systems Principles, Oct. 1997, Saint-Malo, France, retrieved on Jun. 23, 2009 at <<http://www.csl.sri.com/users/ddean/papers/sosp97.pdf>>, pp. 1-26.

Wang, et al., "Protection and Communication Abstractions for Web Browers in MashupOS", SOSP'07, Oct. 14-17, 2007, Stevenson, WA, retrieved on Jun. 23, 2009 at <<http://research.microsoft.com/en-us/um/people/helenw/papers/sosp07mashupos.pdf>>, 15 pgs.

Wang, et al., "The Multi-Principal OS Construction of the Gazelle Web Browser", retrieved on Jun. 23, 2009 at <<http://research.microsoft.com/pubs/79655/gazelle.pdf>>, MSR Technical Report MSR-TR-2009-16, pp. 1-20.

"What's New in Internet Explorer 8", retrieved on Jun. 23, 2009 at <<http://msdn.microsoft.com/en-us/library/cc288472.aspx>>, Microsoft Corporation, 2009, pp. 1-10.

Wilburn, et al., "The Light Field Video Camera", retrieved on Jun. 23, 2009 at <<http://graphics.stanford.edu/papers/lfvc/wilburn-lfcamera-spie02.pdf>>, Computer Systems Lab, Electrical Engineering Department, Stanford University, 8 pgs.

Wobber, et al., "Authorizing Applications in Singularity", ACM, EuroSys'07, Mar. 21-23, 2007, Lisboa, Portugal, retrieved on Jun. 23, 2009 at <<http://research.microsoft.com/pubs/59976/eurosys2007_security.pdf>>, 14 pgs.

"Secure web browsing with the OP web browser" Grier et al, <<http://www.cs.uiuc.edu/homes/kingst/Research_files/grier08.pdf>> retrieved on Feb. 12, 2009, 15 pages.

"The Multi-Principal OS Construction of the Gazelle Web Browser" Wang et al, Microsoft Research, <<http://research.microsoft.com/apps/pubs/default.aspx?id=79655>> available as early as Feb. 19, 2009. 1 page.

van Kesteren (ed.), "XMLHttpRequest", retrieved on May 24, 2010 at <<http://www.w3.org/TR/XMLHttpRequest/>>, W3C Working Draft, Nov. 29, 2009, pp. 1-17.

"Adobe Flash Player 9 Security Whitepaper", retrieved on May 24, 2010 at <<http://www.adobe.com/devnet/flashplayer/articles/flash_player_9_security.pdf>>, Adobe Systems Incorporated, Jul. 2008, pp. 1-50.

Barth, et al., "Protecting Browsers from Frame Hijacking Attacks", retrieved on May 24, 2010 at <<http://crypto.stanford.edu/ websec/frames/navigation/>>, Stanford Web Security Research, 2007, pp. 1-5.

Barth, et al., "Securing Frame Communication in Browsers", retrieved May 24, 2010 at <<http://seclab.stanford.edu/websec/frames/post-message.pdf>>, Communications of the ACM, vol. 52, No. 6, Jun. 2009, pp. 83-91.

"Changes in AllowScriptAccess default (Flash Player)", retrieved on May 24, 2010 at <<http://www. adobe.com/go/kb403183>>, Adobe Systems Incorporated, 2010, pp. 1-8.

Chen, et al., "An Analysis of Browser Domain-Isolation Bugs and a Light-Weight Transparent Defense Mechanism", retrieved on May 24, 2010 at <<http://research.microsoft.com/en-us/um/people/shuochen/papers/scriptaccenting.pdf>>, ACM, Proceedings of Conference on Computer and Communications Security (CCS), Alexandria, VA, 2007, pp. 2-11.

"Components.utils.evalInSandbox", retrieved Jun. 4, 2010, from:https://developer.mozilla.org/En/Components.utils.evalInSandbox, 4 pages.

Crockford, "JSONRequest", retrieved on May 24, 2010 at <<http://www.json.org/jsonrequest.html>>, Apr. 17, 2006, pp. 1-8.

Crockford, "The module Tag, A Proposed Solution to the Mashup Security Problem", retrieved on May 24, 2010 at <<http://www.json.org/module.html>>, Oct. 30, 2006, pp. 1-3.

"Cross-domain Vulnerability in Microsoft Internet Explorer 6", retrieved on May 24, 2010 at <<http://cyberinsecure.com/cross-domain-vulnerability-in-microsoft-internet-explorer-6/>>, CyberInsecure.com, Jun. 27, 2008, pp. 1-9.

D. Kristol and L. Montulli. "HTTP State Management Mechanism". RFC 2965, Oct. 2000, 25 pages.

Dhamija, et al., "The Battle Against Phishing: Dynamic Security Skins", retrieved on May 24, 2010 at <<http://citeseerx.ist.psu.edu/viewdoc/download?doi=10.1.1.60.9398&rep=rep1&type=pdf>>, Symposium on Usable Privacy and Security (SOUPS), Pittsburgh, PA, Jul. 2005, pp. 1-12.

"Document Object Model (DOM) Level 2 Core Specification", retrieved on May 24, 2010 at <<http://www.w3.org/TR/DOM-Level-2-Core/>>, W3C Recommendation, Nov. 13, 2000, pp. 1-3.

"Document Object Model (DOM) Level 3 Core Specification", retrieved on May 24, 2010 at <<http://www.w3.org/TR/DOM-Level-3-Core/>>, W3C Recommendation, Apr. 7, 2004, pp. 1-3.

Dutta, "Client Side Cross-Domain Security Whitepaper", retrieved on May 24, 2010 at <<http://code.msdn.microsoft.com/xdsecuritywp/Release/ProjectReleases.aspx?ReleaseId=1157>>, Microsoft Corporation, Jun. 2008, pp. 1-24.

"Firefox 3 for developers—MDC", retrieved on May 24, 2010 at <<https://developer.mozilla.org/en/Firefox_3_for_developers>>, mozilla.org, Sep. 1, 2009, pp. 1-9.

Flanagan, D., JavaScript: The Definitive Guide. O'Reilly Media Inc., Aug. 2006.

Goldberg, et al., "A Secure Environment for Untrusted Helper Applications, Confining the Wily Hacker", retrieved on May 24, 2010 at <<http://www.cypherpunks.ca/~iang/pubs/janus-usenix96.pdf>>, USENIX Association, Proceedings of Conference on Security Symposium, Focusing on Applications of Cryptography, vol. 6, 1996, pp. 1-13.

GreenBorder—Wikipedia, retrieved Jun. 4, 2010 from: http://en.wikipedia.org/wiki/GreenBorder, 1 page.

Grier, et al., "building a more secure Web browser", retrieved on May 24, 2010 at <<http://www.usenix.org/publications/login/2008-08/pdfs/grier.pdf>>, Login: The USENIX Magazine, vol. 33, No. 4, Aug. 2008, pp. 14-21.

Grossman, "Advanced Web Attack Techniques using GMail", retrieved on May 24, 2010 at <<http: //jeremiahgrossman.blogspot.com/2006/01/advanced-web-attack-techniques-using.html>>, Jan. 27, 2006, pp. 1-7.

"How Mozilla determines MIME Types", Aug. 2006, retrieved from: http://developer.mozilla.org/en/docs/How_Mozilla_determines_MIME_Types., 4 pages.

"HTML 4.01 Specification", retrieved on May 24, 2010 at <<http://www.w3.org/TR/REC-html40/>>, W3C Recommendation, Dec. 24, 1999, pp. 1-12.

HTML5 (including next generation additions still in development), Draft Standard, Jun. 2, 2010, Retrieved from: http://www.whatwg.org/specs/web-apps/current-work/, 384 pages.

Hunt, et al., "Detours: Binary Interception of Win32 Functions", retrieved on May 24, 2010 at <<http://research.microsoft.com/pubs/68568/huntusenixnt99.pdf>>, USENIX Association, Proceedings of Windows NT Symposium, Seattle, WA, Jul. 1999, pp. 1-9.

"IE content-type logic", retrieved on May 24, 2010 at <<http://blogs.msdn.com/ie/archive/2005/02/01/364581.aspx>>, Microsoft Corporation, IEBlog, 2010, pp. 1-16.

"IEBlog—IE8 Security Part V—Comprehensive Protection", retrieved on May 24, 2010 at <<http://blogs.msdn.com/ie/archive/2008/07/02/ie8-security-part-v-comprehensive-protection.aspx>>, Microsoft Corporation, IEBlog, 2010, pp. 1-41.

"Introducing JSON", retrieved on May 24, 2010 at << http://www.json.org/>>, JSON, 2010, pp. 1-6.

Ioannidis, et al., "Building a Secure Web Browser", retrieved on May 24, 2010 at <<http://citeseerx.ist.psu.edu/viewdoc/download-?doi=10.1.1.120.2439&rep=rep1&type=ps>>, USENIX Association, Proceedings of FREENIX Track: 2001 Technical Conference, 2001, pp. 127-134.

Jackson, et al., "Protecting Browser State from Web Privacy Attacks", retrieved on May 24, 2010 at <<http://citeseerx.ist.psu.edu/viewdoc/download?doi=10.1.1.75.4136&rep=rep1&type=pdf>>, ACM, Proceedings of International Conference on World Wide Web (WWW), Edinburgh, UK, May 2006, pp. 737-744.

Jackson, et al., "Protecting Browsers from DNS Rebinding Attacks", retrieved on May 24, 2010 at <<http://crypto.stanford.edu/dns/dns-rebinding.pdf>>, ACM, Proceedings of Conference on Computer and Communications Security (CCS), Alexandria, VA, 2007, pp. 421-431.

Meketa, "Security changes in Flash Player 7", retrieved on May 24, 2010 at <<http://www.adobe.com/devnet/flash/articles/fplayer_security.html>>, Adobe Systems Incorporated., Flash Player Developer Center, 2010, pp. 1.

"Microsoft Internet Explorer Remote Window Hijacking Vulnerability", retrieved on May 24, 2010 at <<http://www.securityfocus.com/bid/11855>>, SecurityFocus, Dec. 8, 2004, pp. 1-18.

"Microsoft Secuity Intelligence Report (SIR)", retrieved on May 24, 2010 at <<http://www.microsoft.com/security/portal/sir.aspex>>, Microsoft Corporation, Malware Protection Center, vol. 8, 2009, pp. 1-3.

"Microsoft working on a new secure Web Browser—Gazelle", retrieved on May 24, 2010 at <<http://www.computersafetytip.com/microsoft-working-on-a-new-secure-web-browser-%E2%80%93-gazelle.html>>, Computersafetytip.com, Mar. 10, 2009, pp. 1-3.

"Microsoft's 'Gazelle' Browser more secure than all others", retrieved on May 24, 2010 at <<http://forum.thewindowsclub.com/microsoft-technologies-discussions/27090-microsofts-gazelle-browser-more-secure-than-all-others.html>>, The Windows Club, Feb. 24, 2009, pp. 1-4.

Miller, et al., "Paradigm Regained: Abstraction Mechanisms for Access Control", retrieved on May 24, 2010 at <<http://www.springerlink.com/index/L52PWK0K3G02E37B.pdf>>, Springer-Verlag Berlin, Lecture Notes in Computer Science vol. 2896, Advances in Computer Science—ASIAN 2003, 2003, pp. 224-242.

"MIME Type Detection in Internet Explorer", retrieved on May 24, 2010 at <<http://msdn.microsoft.com/en-us/library/ms775147.aspx>>, Microsoft Corporation, 2010, pp. 1-4.

Morrisett, et al., "From System F to Typed Assembly Language", retrieved on May 24, 2010 at <<http://citeseerx.ist.psu.edu/viewdoc/download?doi=10.1.1.24.6526&rep=rep1&type=pdf>>, ACM Transactions on Programming Languages and Systems (TOPLAS), vol. 21, No. 3, 1999, pp. 527-568.

"Mozilla Browser and Mozilla Firefox Remote Window Hijacking Vulnerability", retrieved on May 24, 2010 at <<http://www.securityfocus.com/bid/11854/>>, SecurityFocus, Dec. 8, 2004, pp. 1-10.

Necula, et al., "Safe Kernel Extensions Without Run-Time Checking", retrieved on May 24, 2010 at <<http://www.cs.arizona.edu/~collberg/Teaching/620/1999/Handouts/imurdock1.pdf>>, ACM SIGOPS Operating Systems Review, vol. 30, No. SI, 1996, pp. 229-243.

".NET Framework Developer Center", retrieved on May 24, 2010 at <<http://msdn.microsoft.com/en-us/netframework/default.aspx>>, Microsoft Corporation, 2010, pp. 1.

Process Models (The Chromium Projects), "The Chromium Projects", 2008, retrieved on Jun. 4, 2010 from http://dev.chromium.org/developers/design-documents/process-modelshttp://dev.chromium.org/developers/design-documents/process-models, 5 pgs.

Reis, et al., "Browser Security: Lessons from Google Chrome", retrieved on May 24, 2010 at <<http://www.adambarth.com/papers/2009/reis-barth-pizano.pdf>>, Communications of the ACM, vol. 52, No. 8, 2009, pp. 45-49.

Reis, et al., "Using Processes to Improve the Reliability of Browser-based Applications", retrieved on May 24, 2010 at <<http://citeseerx.ist.psu.edu/viewdoc/download;jsessionid=EFE2131C07872525A24DD03BDBBAB2F2?doi=10.1.1.136.2646&rep=rep1&type=pdf>>, University of Washingto, Technical Report UW-CSE-2007-12-01, 2007, pp. 1-13.

Ruderman, J. "Same origin policy for JavaScript", retrieved Jun. 4, 2010, from:https://developer.mozilla.org/En/Same_origin_policy_for_JavaScript, 2 pages.

"Security Advisories for Firefox 2.0", retrieved on May 24, 2010 at <<http://www.mozilla.org/security/known-vulnerabilities/firefox20.html>>, Mozilla.org, 2010, pp. 1-6.

"Security Center—Bulletins Advisories Tools Guidance Resources", 2010, retrieved Jun. 4, 2010 from: http://technet.microsoft.com/en-us/security/default(printer).aspx, 2 pages.

Shankar, et al., "Doppelganger: Better Browser Privacy Without the Bother", retrieved on May 24, 2010 at <<http://citeseerx.ist.psu.edu/viewdoc/download?doi=10.1.1.68.4489&rep=rep1&type=pdf>>, ACM, Proceedings of Conference on Computer and Communications Security (CCS), Alexandria, VA, 2006, pp. 154-167.

Turner, D., Symantec internet security threat report: Trends for Jan.-Jun. 2007, Technical Report Symantec Inc., vol. XII, 134 pages.

van Kesteren (ed.), "XMLHttpRequest Level 2", retrieved on May 24, 2010 at <<http://dev.w3.org/2006/webapi/XMLHttpRequest-2/>>, W3C, 2009, pp. 1-23.

W3C. Authorizing Read Access to XML Content Using the <?accesscontrol?> Processing Instruction 1.0. http://www.w3.org/TR/access-control/, May 2006, 1 page.

Wagner, et al., "A Security Analysis of the Combex DarpaBrowser Architecure", retrieved on May 24, 2010 at <<http://www.combex.com/papers/darpa-review/security-review.html>>, Darpa Review, Mar. 2, 2002, pp. 1-26.

Wang et al., "Protection and Communication Abstractions in MashupOS". In ACM Symposium on Operating System Principles, Oct. 2007, 15 pages.

Yu, et al., "JavaScript Instrumentation for Browser Security", retrieved on May 24, 2010 at <<http://www.docomolabsresearchers-usa.com/~dyu/js-tr.pdf>>, ACM, Proceedings of Symposium on Principles of Programming Languages (POPL), Jan. 2007, Nice, FR, pp. 237-249.

Office Action for U.S. Appl. No. 12/550,263, mailed on Dec. 21, 2011, Jiahe Helen Wang, "Access Control in a Multi-Principal Browser", 16 pgs.

The Chromium Projects, Process Models, (Chromium Developer Documentation), 2008, 5 pages, obtained from <<http://dev.chromium.org/developers/design-documents/process-models>>, on Jul. 26, 2010.

* cited by examiner

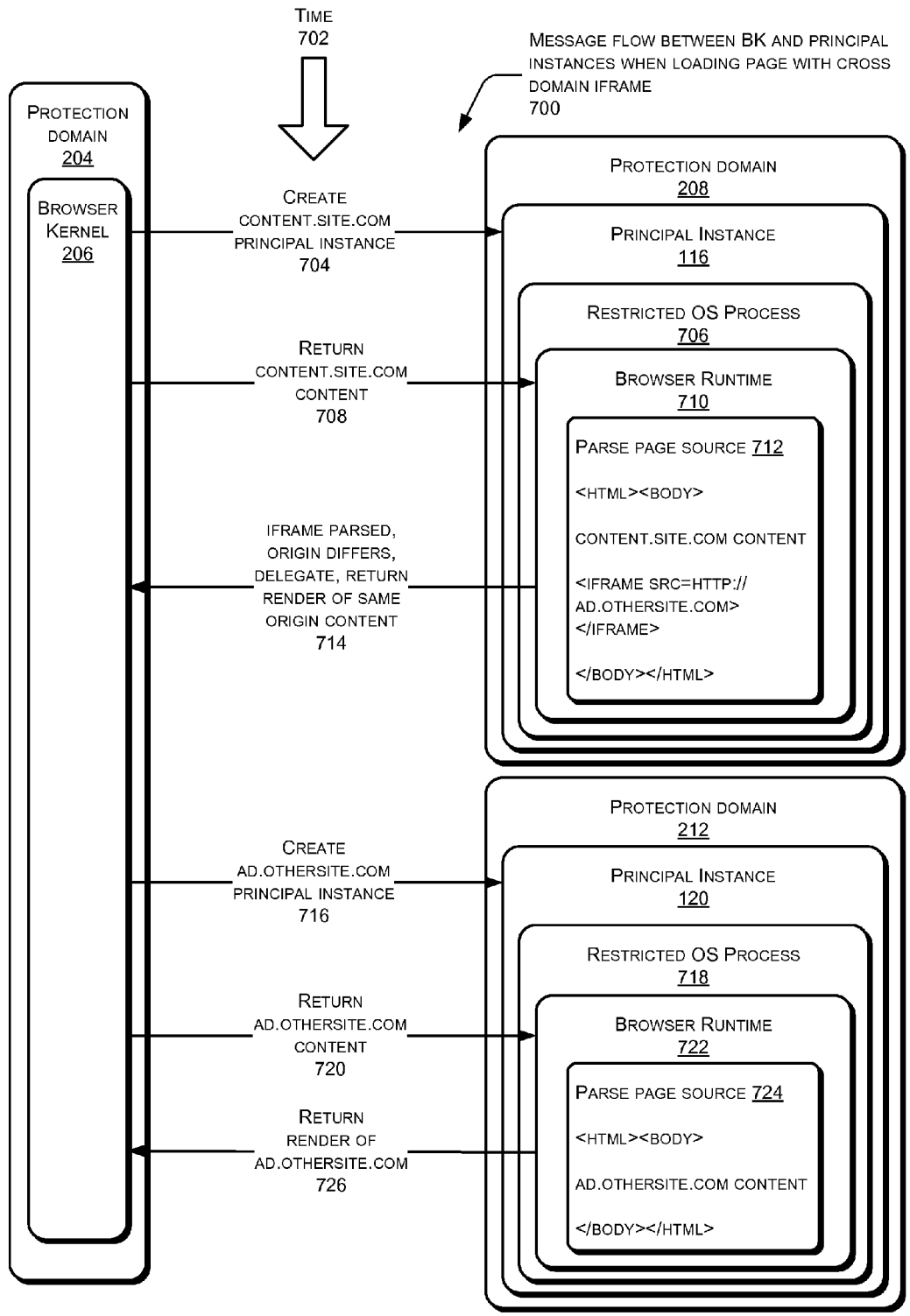

SECURE MULTI-PRINCIPAL WEB BROWSER

BACKGROUND

Web browsers were originally designed and built as single principal platforms on which a principal, namely a web site, is viewed one at a time and the browser resources are devoted to that site. Web sites then evolved from static, single principal pages, to pages that include foreign content by using tags with a "src" attribute and dynamic content that uses JavaScript® and similar technologies. The Same Origin Policy (SOP) was introduced to try and completely isolate web sites from one another and prevent cross-domain interactions and interferences.

However, with the advent of asynchronous communications and client mashups, the SOP's complete isolation has become too restrictive for this new generation of web services that demand rich cross-domain interactions. While current web browsers have evolved to meet web services' demands, they are still built on top of the old single principal architecture. In these architectures, protection is realized by adding pervasive checks to the existing browser software at the object property and method level rather than by using operating system processes and hardware protections.

Construction in this architecture is error-prone, as is manifested by many vulnerabilities in existing browsers. Often, a vulnerability exploited by a single change to a web site principal compromises the browser and all other principals. Furthermore, browser plugins are treated as part of the browser's trusted computing base and can have direct interactions with system resources. Plugins may even have their own security policies. As a result, compromising a plugin compromises the entire browser, and potentially the entire system.

As the world migrates to a software-as-service paradigm and browsers become a dominant computing platform, the single-principal based browser platform has become an easy target. Widespread web attacks are costly and devastating. While some browsers use OS processes to provide isolation across browser tabs, this granularity of isolation is insufficient because a user may browse multiple mutually distrusting sites in a single tab. Furthermore, a single page may contain an iframe or other embedded content from an untrusted site (e.g., ads).

Thus, what is desired what is desired is a browser operating system which aligns the unit of protection with the existing web site principal. The unit of protection may be an OS process or some other protection mechanisms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. While web pages using hypertext markup language (HTML) are referenced in this application, other markup languages may also be used.

A web site principal may have one or more principal instances. Protection takes place at a principal level. That is, different principals run in different protection domains. These protection domains are isolated from one another. Each principal instance thus is a unit of failure containment and resource allocation. Different mechanisms may be used for the unit of protection, unit of failure containment, and the unit of resource allocation, such as a restricted OS process (ROSP).

Principal origin may be determined using a combination including protocol, domain name, and port. The browser kernel mediates communications between principal instances, and between the principal instances and the operating system. Therefore, principals do not directly access the underlying operating system.

To enhance security, subdomains are prohibited from setting their domain, and limitations are placed on rendering transparent or overdrawn elements. Within each principal instance, a browser runtime executes as a restricted operating system process (ROSP), while any plugins are executed as a separate ROSP within the same principal instance. The browser kernel combines renderings from each browser runtime for presentation to a user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 is an illustrative message flow between a browser kernel and principal instances when loading a page with a cross domain iframe.

DETAILED DESCRIPTION

Overview

As described above, current web browsers are susceptible to cross-principal attacks and faults, as well as malicious or undesired actions by a plugin. Compromise of a principal may compromise the entire browser and the web for a user. Principals are web pages of different origins, as defined by the origin tuple of a protocol, a domain name, and a port.

This disclosure describes a multi-principal browser operating system (BOS) which aligns the process protection boundary with the existing browser principal using the origin tuple. Each principal has a different origin tuple, and each principal's content is put into a separate principal instance for that origin tuple. Each principal instance may execute a restricted operating system (OS) process for a browser runtime and another restricted BOS process for plugins.

The BOS processes of each principal are restricted, not permitted to interact with the underlying operating system, and must use system calls provided by the browser kernel (browser kernel). The browser kernel runs as a separate process in the underlying OS, and manages system resources for web principals while interacting with the underlying OS. For example, individual principals render content into bitmap objects managed and displayed under the direction of a browser kernel.

Use of the browser kernel and separating principals into principal instances enforces several beneficial results: First, communication and sharing across the protection boundaries of each principal must be explicit and use the browser kernel. Second, least privileges (that is, giving no more privileges than necessary for operation) for each principal are maintained, so compromise of a principal will not give the principal more capabilities than already permitted by the browser kernel. Third, security policies are enforced for plugins. Fourth, the browser kernel provides a central point to implement security decisions, resulting in a simpler and more robust architecture. Thus security policies are consistent across all resources, including memory, Document Object Model (DOM) objects, script objects, persistent state objects such as cookies, display, and network communications.

Multi-Principal Web Browser

Figure 1:
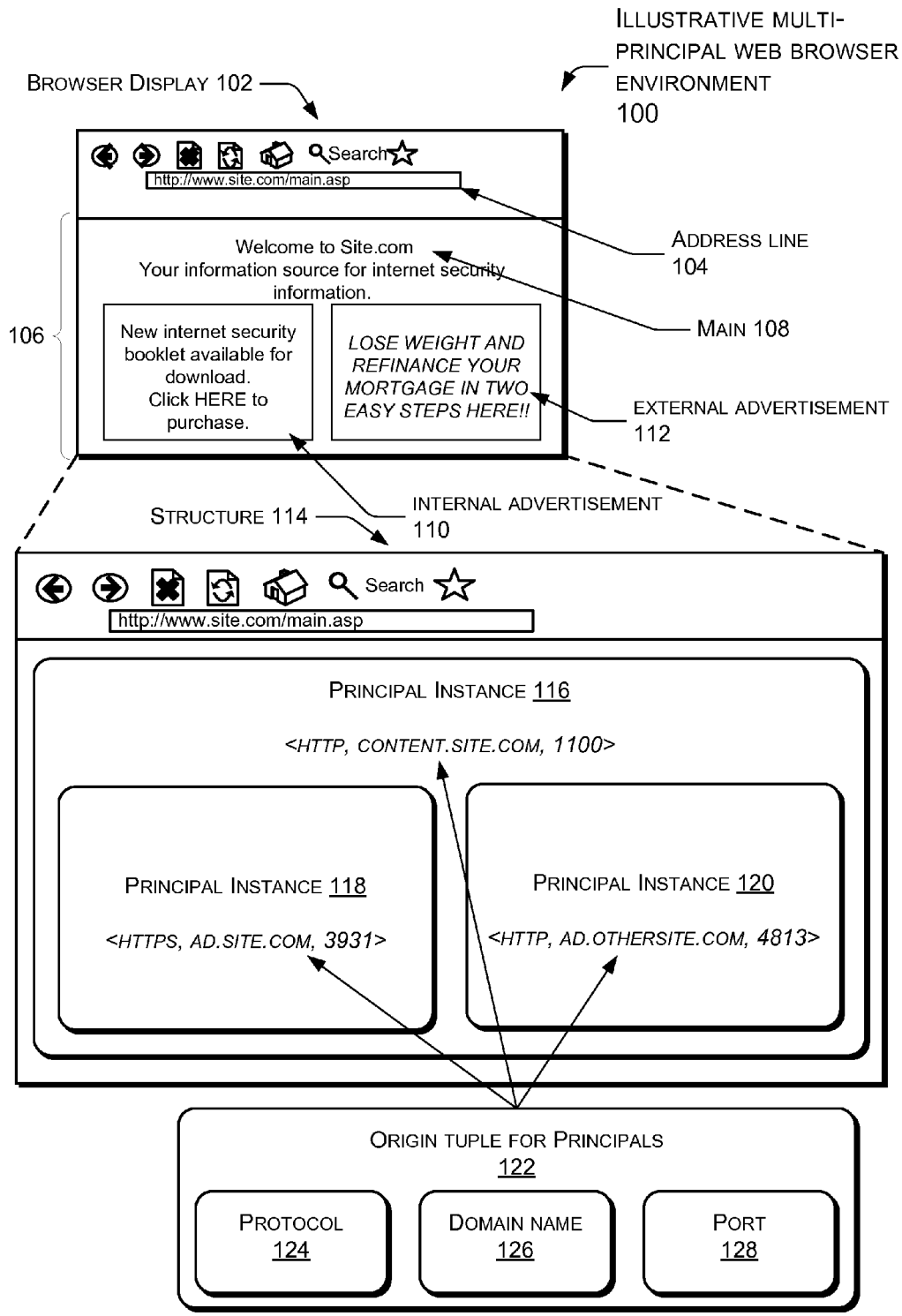
FIG. 1 is an illustrative schematic of a multi-principal web browser environment.

FIG. 1 is an illustrative schematic of a multi-principal web browser environment 100. An exemplary browser display 102 is shown, and may include user interface controls to allow a user to control the browser. Browser display 102 may be presented on a variety of computing devices, including personal computers, netbooks, smartphones, handheld personal computers, thin clients, etc.

Browser display 102 illustrates content from an exemplary web page. Address line 104 of the browser display 102 shows that the site being displayed is http://www.site.com/main.asp using Hyptertext Transfer Protocol (HTTP). Shown within the browser rendering window 106 are three display elements: a main display element 108 and within main display element 108 are an internal advertisement display element 110 and external advertisement display element 112. To a user, it may be difficult or impossible to determine from looking at browser rendering window 106 whether these elements are from one web site or many. A variety of processes for presenting this content in HTML exist, including the use of the following tags: inline-frame <iframe>, <object>, <embed>, <img>, and <input> when including an image using a "src" attribute, etc.

Shown below the content presented in 102 is the underlying structure 114. Each principal is a web page from a specific origin, and each principal exists in a separate principal instance. For example, main display element 108 is a first principal instance 116, internal advertisement display element 110 is a second principal instance 118, and external advertisement display element 112 is a third principal instance 120. As described above, principals are web pages having different origin tuples. An origin tuple 122 may include a protocol 124, a domain name 126, and a port 128, and may be expressed using the notation <protocol, domain name, port>.

Elements 108, 110, and have the following tuples:

TABLE 1

| Display Element | Principal Instance | Origin tuple |
| --- | --- | --- |
| 108 | 116 | <http, content.site.com, 1100> |
| 110 | 118 | <https, ad.site.com, 3931> |
| 112 | 120 | <http, ad.othersite.com, 4813> |

Because the origin tuples in this example differ from one another, each is a different principal. Thus, each display element shown in this example is a separate principal instance.

Browser display 102 is also an example of mixed content, as main display element 108 uses the HTTP protocol and incorporates a secured display element 110 which uses Hypertext Transfer Protocol Secure (HTTPS). Placement of these elements in separate principal instances 116 and 118, respectively, improves security.

However, the opposite situation where an HTTPS principal embeds a script of style sheet transmitted over HTTP, poses serious security concerns. In this situation, a network attacker could compromise the HTTP transmitted script or style sheet, and attack the HTTPS principal. Thus, rendering of HTTP transmitted scripts or style sheets for an HTTPS principal is denied in this browser. In one implementation, a user, with a corresponding loss of security, may disable this denial.

As described next, these multiple separate principal instances result in a secure browser environment.

Communication Between Principal Instances

Figure 2:
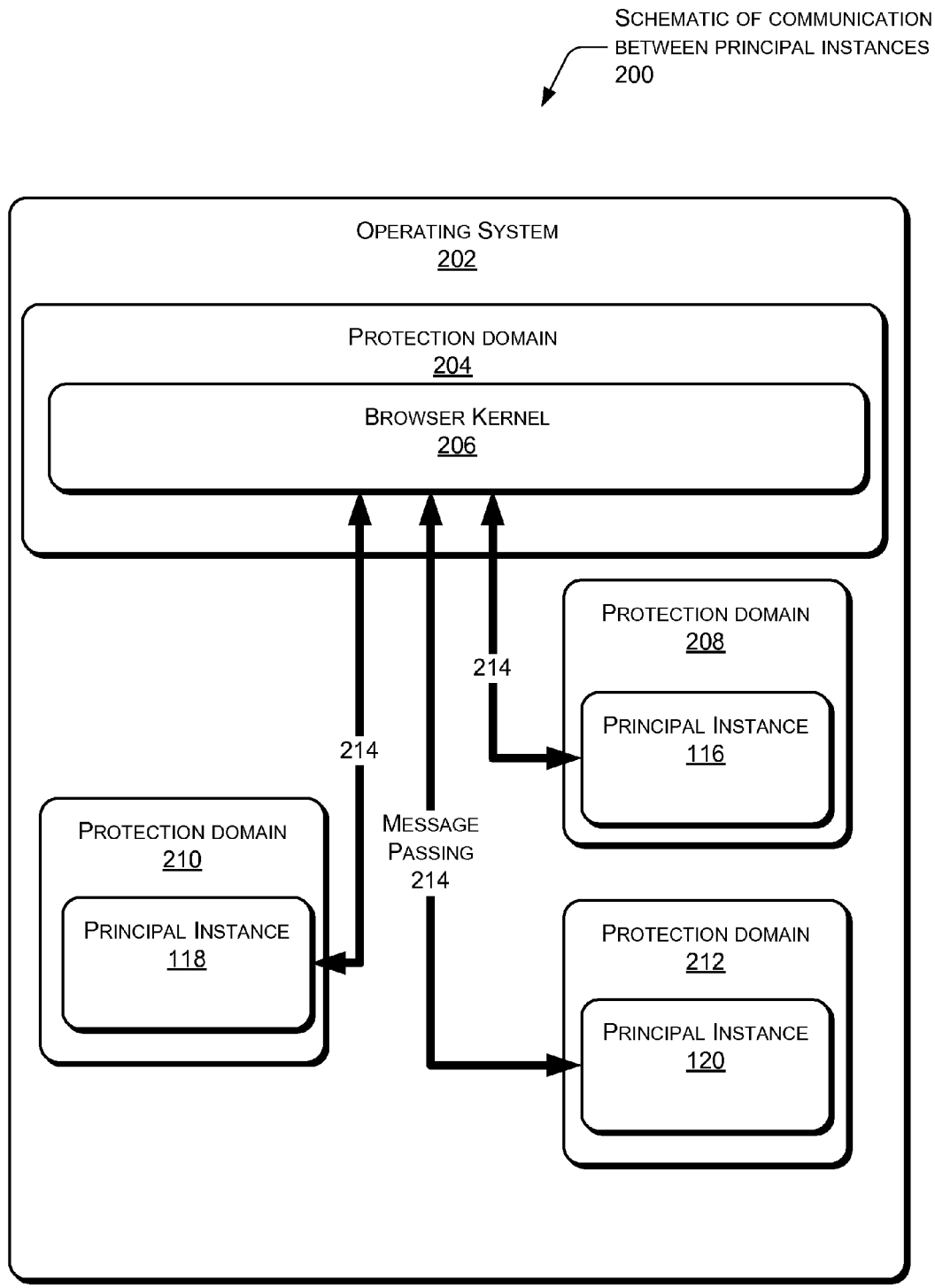
FIG. 2 is an illustrative schematic of communication between the principal instances of FIG. 1.

FIG. 2 is an illustrative schematic 200 of communication between the principal instances of FIG. 1. Operating system 202 is shown, and may be stored on a memory and executed on a processor. Executing within operating system 202 is a protection domain 204. A protection domain may comprise a hardware-isolated protection domain executed within the underlying operating systems. Within protection domain 204 browser kernel 206 executes. Separate protection domains at provided for each principal instance. In this example, principal instance 116 executes within protection domain 208, principal instance 118 executes within protection domain 210, and principal instance 120 executes within protection domain 212.

Each of the principal instances may communicate with the other principal instances via browser kernel 206 using message passing 214. This message passing 214 between principals must be explicit from one principal instance to another. In one implementation, the message passing may be accomplished in the same fashion as inter-process communication (IPC).

Plugins

Figure 3:
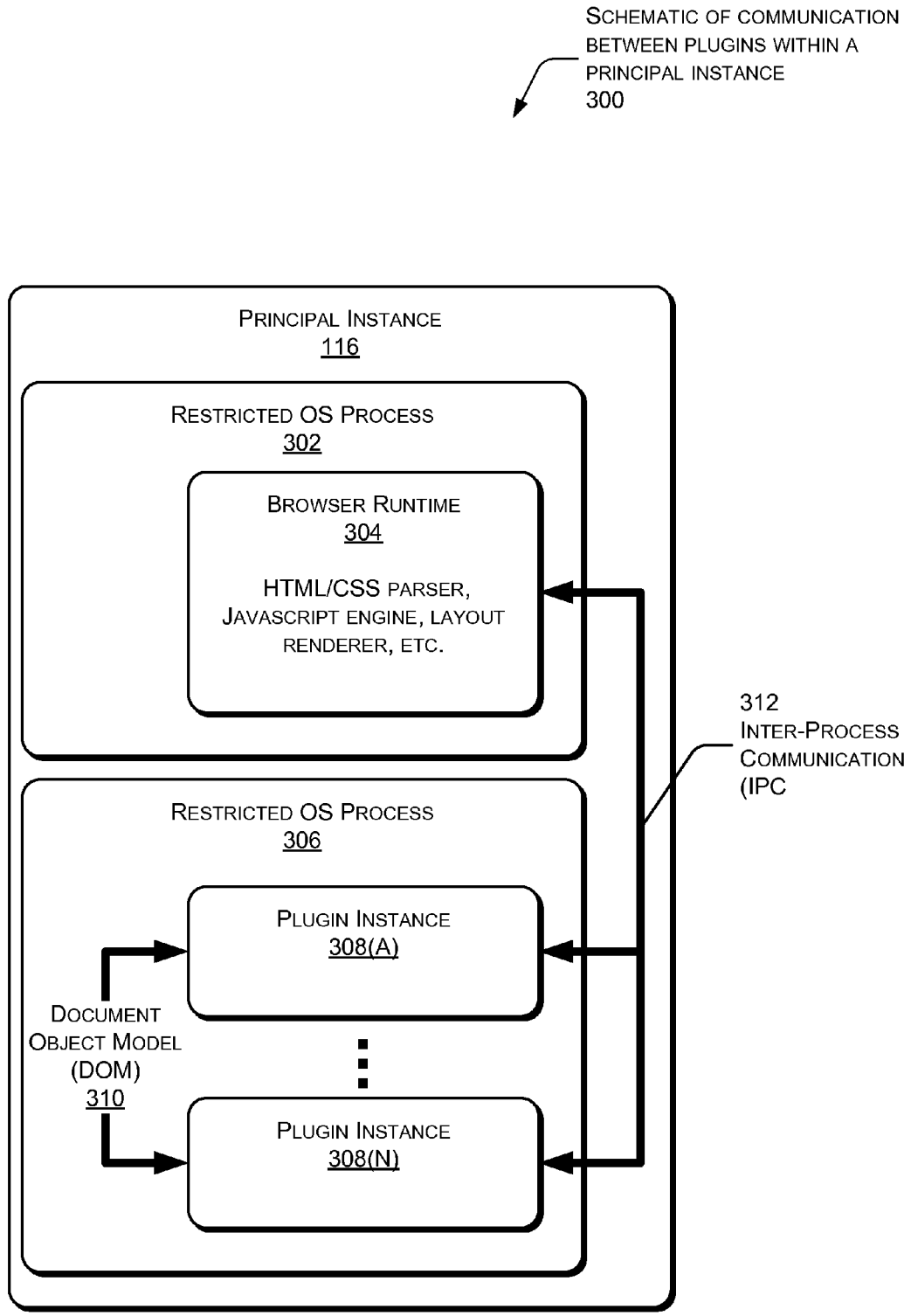
FIG. 3 is an illustrative schematic of communication between plugins and a browser runtime within a principal instance of FIG. 1.

FIG. 3 is an illustrative schematic 300 of communication between a browser runtime and plugins within one of the principal instances of FIG. 1. Plugins are applications which interact with a web browser to provide additional functionality.

Within the protection domain 208 executing within browser kernel 206, principal instance 116 is shown. A restricted OS process (ROSP) 302 executes within principal instance 116. Within ROSP 302 a browser runtime 304 executes. Browser runtime 304 may execute an HTML parser, cascading style sheet (CSS) parser, JavaScript® or other scripting engine, layout renderer, etc. Also within principal instance 116 is a second ROSP 306. Within second ROSP 306 plugin instances 308(A) to 308(N) may execute.

Because each plugin instance is within ROSP 306, plugin instances 308(A) to 308(N) may communicate using document object model (DOM) 310, or other interfaces or protocols. DOM provides a platform and language-neutral interface that allows scripts to dynamically access and update content, structure, and style of a document displayed within a principal. Thus, the DOM 310 communication remains within ROSP 306.

Communication 312 between plugin instances 308(A) . . . 308(N) and the browser runtime 304 is also permitted. Communication 312 also occurs within principal instance 116. Thus, this compartmentalization enables the browser kernel 206 to control access by plugins 308(A) . . . 308(N) to the browser runtime 304, as well as preventing the plugin 308 from directly accessing the underlying operating system 202.

The compartmentalization of principals among principal instances may affect backward compatibility. For example, the system call semantics between the browser runtime and the browser kernel introduces a subtle issue: cross-origin script sources are readable by the issuing principal, which does not conform to the existing SOP. The SOP dictates that a script can be executed in a cross-origin fashion, but the access to its source code is restricted to same-origin only. While it is extremely dangerous to hide sensitive data inside a script, web programmers may build their services with the assumption that script code cannot be read across origins. Furthermore, it is increasingly common for web programmers to adopt JavaScript® Object Notation (JSON) as the preferred data-interchange format. Web sites often demand such data to be same-origin access only. To prevent such data from being accidentally accessed through <script> (by a different origin), web programmers sometimes put "while (1);" prior the data definition or put comments around the data so that accidental script inclusion would result in infinite loop execution or no operation. Because of this assumption and practice, additional protection to cross-domain script source is provided.

For each principal instance, browser runtime code and plugin code are executed in separate ROSPs. The ROSP executing the plugin instance process cannot issue the getCrossOriginContent( ) and may be configured to only interact with cross-origin scripts and style sheets through the browser runtime instance ROSP.

In this architecture, the quality of protecting cross-origin script and style-sheet source relies on the browser runtime code quality. While this protection is not perfect with native browser code implementation, the architecture offers stronger protection than existing browsers.

The separation of browser runtime code and plugin code into separate ROSPs also improves reliability by containing plugin failures. In one implementation, a plugin model using sandboxed processes to contain each browser principal's plugin content may be used.

To further enhance security and prevent another avenue of attack, the browser kernel prohibits subdomains from setting their domain. For example, modification of the document.domain DOM property of a page allows different pages to fall within the same origin for determination of same origin. Web pages at news.site.com and ad.site.com may have their document.domain properties set to "site.com." Thus, these subdomains would appear to have the same origin of "site.com" to a browser. In effect, the document.domain property circumvents the origin determination process. Thus, the BOS does not allow a subdomain to set its domain.

This restriction on allowing a subdomain to set its domain may pose backward compatibility problems with regards to cookie access. Web features such as single sign-on frequently use a cookie from a suffix domain which is required to be accessible to a sub-domain. In order to allow backward compatibility for cookie access, cross-principal communications 214 are used.

Figure 4:
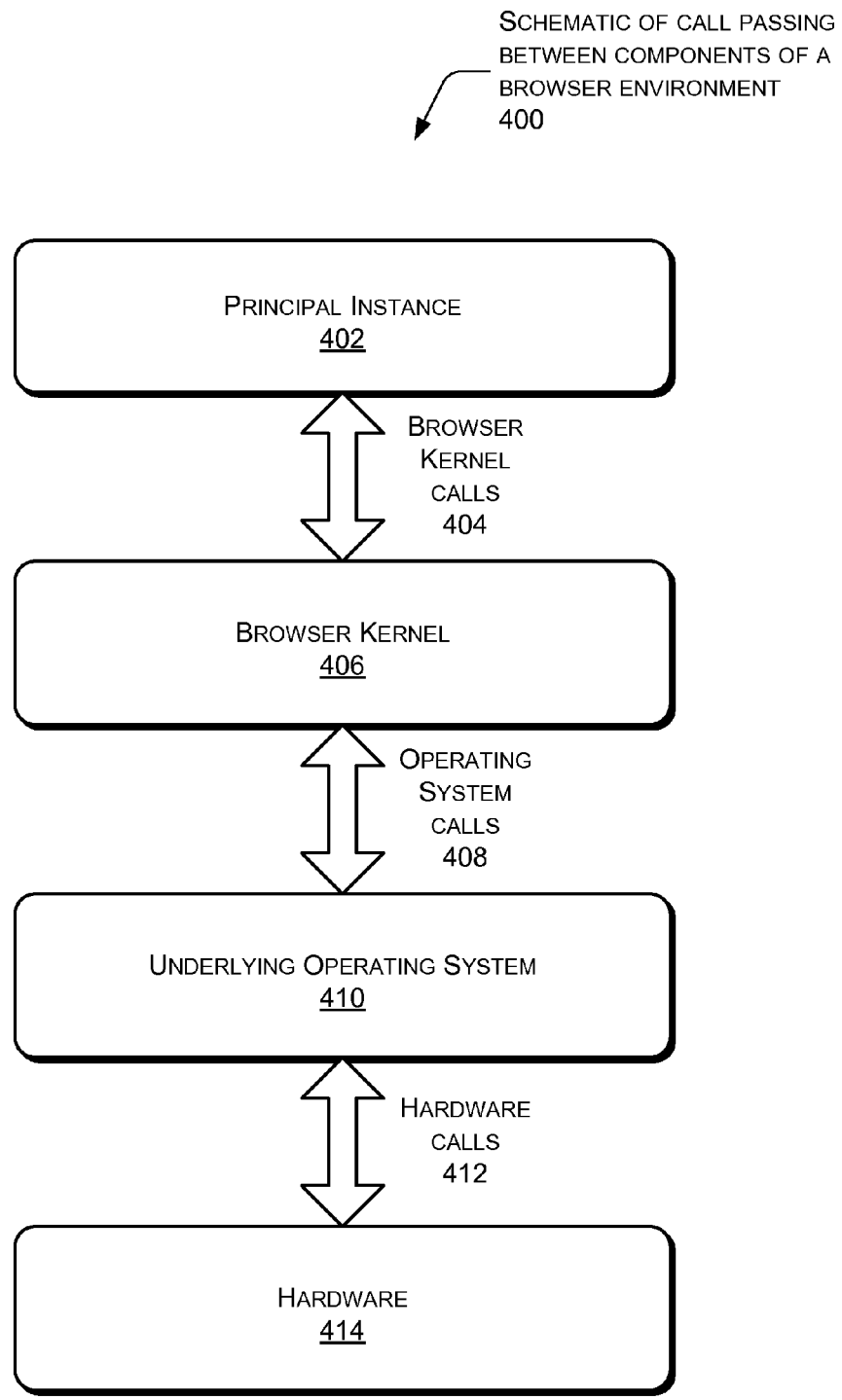
FIG. 4 is an illustrative schematic of call passing between components of the browser environment.

FIG. 4 is an illustrative schematic of call passing between components of the browser environment 400. A principal instance 402 makes calls 404 for resources at the browser kernel 406. Browser kernel 406 in turn determines what calls 408 may be safely passed to underlying operating system 410. Operating system 410 may then make calls 412 to hardware, finally accessing hardware 414 such as display, network adapters, memory, etc. Similarly, calls may be made from lower to higher levels.

Presentation of Rendered Web Pages

In addition to securing the underlying processes, the BOS provides additional security by managing the presentation of display elements from different origins. This management is facilitated using a landlord/tenant model for display elements.

Figure 5:
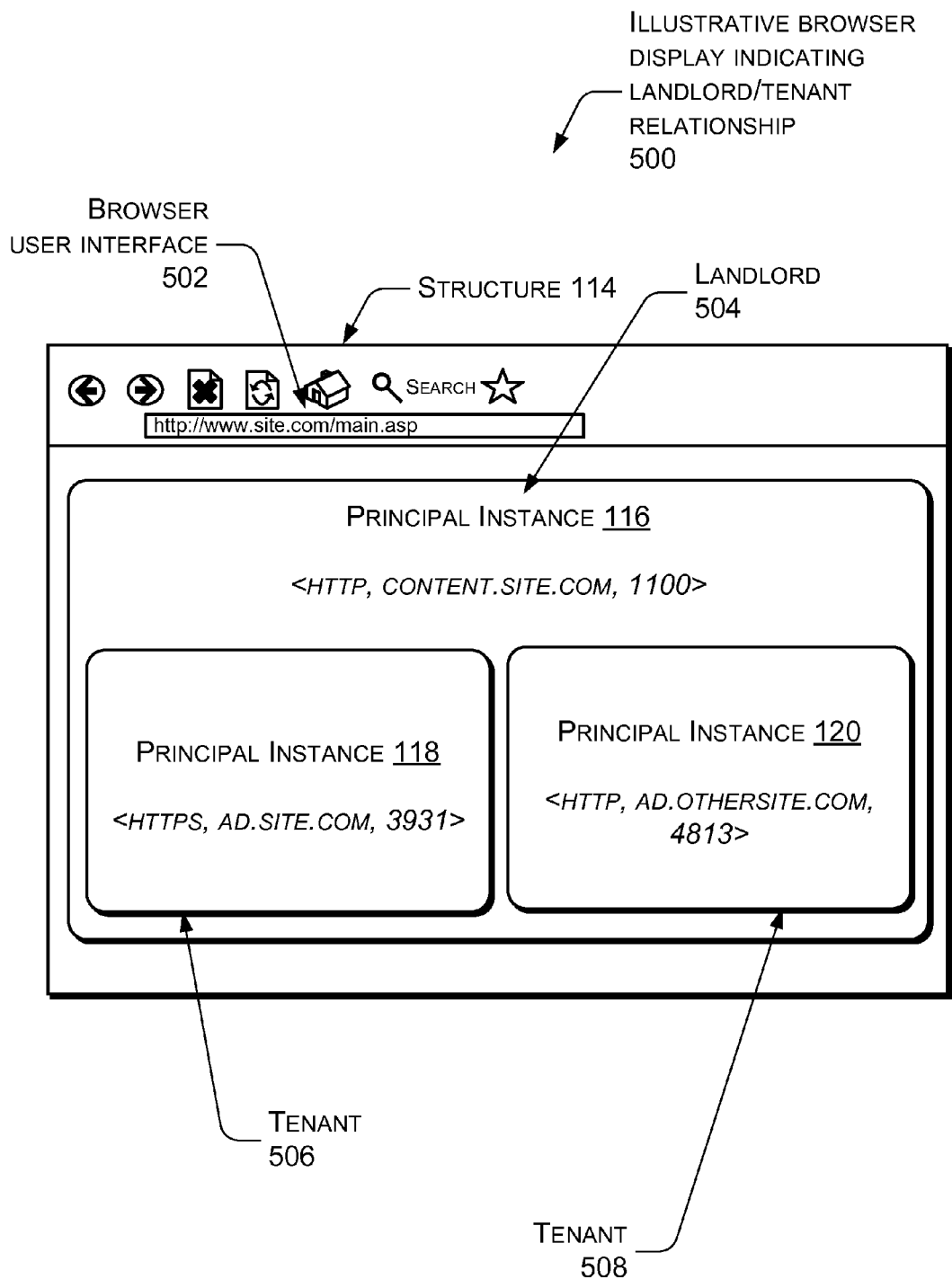
FIG. 5 is an illustrative schematic of a multi-principal web browser environment indicating the landlord/tenant relationship mediated by the browser kernel.

FIG. 5 is an illustrative schematic of a multi-principal web browser environment 500 indicating the landlord/tenant relationship mediated by the browser kernel. A window is a unit of display delegation, which may be delegated from one principal to another. For example, when a web site embeds a frame, the site delegates its display in a newly created window to the principal of the frame content. For example, when the web site content.site.com embeds a frame sourced at ad.othersite.com, content.site.com allocates a window from its own display area and delegates the window to ad.othersite.com. In this case, content.site.com is the landlord of the newly-created window while ad.othersite.com is the tenant of that window. The same kind of delegation happens when cross-domain object and image elements are embedded.

Browser kernel 206 allocates top-level windows or tabs. When the user launches a site through address-bar entry in browser user interface 502, browser kernel 206 delegates the top-level window to the site, making principal instance 116 a landlord 504. Principal instance 118 thus is a tenant 506 of landlord 504. Principal instance 120 is also a tenant 508 of landlord 504.

In one implementation, window creation and delegation results in a delegate (URL; position; dimensions) system call. For each window, browser kernel 206 maintains the landlord, tenant, position, dimensions, pixels in the window, and the URL location of the window content. Browser kernel 206 may manage a three-dimensional display space where the position of a window also contains a stacking order value (toward the browsing user). A landlord provides the stacking order of its delegated windows to browser kernel 206. The stacking order is calculated based on the DOM hierarchy and the CSS z-index values of the windows.

Because a window is created by a landlord and occupied by a tenant, browser kernel 206 must allow reasonable window interactions from both principal instances without losing protection. Browser kernel 206 controls window manipulations as shown in Table 1.

TABLE 1

|  | Landlord | Tenant |
|---|---|---|
| position (x, y, z) | RW |  |
| Dimensions (height, width) | RW | R |
| Pixels |  | RW |
| URL location | W | RW |

With regard to position and dimensions, when a landlord embeds a tenant's content, the landlord should be able to retain control on what is displayed within the landlord's display and a tenant should not be able to reposition or resize the window to interfere with the landlord's display. Therefore, browser kernel 206 enforces that only the landlord of a window can change the position and the dimensions of a window.

With regard to drawing isolation, pixels inside the window reflect the tenant's private content and should not be accessible to the landlord. Therefore, browser kernel 206 enforces that only the tenant can draw within the window, prohibiting practices such as overdrawing cross-domain descendants. This aids in preventing attacks which use a transparent element placed over a legitimate non-transparent element. Nevertheless, a landlord may create overlapping windows delegated to different principal instances.

Setting the URL location of a window in a browser user interface 502 navigates the window to a new site. Navigation is a fundamental element of any web application. Therefore, both the landlord and the tenant are allowed to set the URL location of the window. However, the landlord may not obtain the tenant's navigation history, as this history is private to the tenant. Therefore, browser kernel 206 prevents the landlord from reading the URL location of the tenant. The tenant may read the URL location of the landlord, as long as it remains a tenant of that landlord. For example, when the window is navigated to a different principal, the old tenant will no longer be associated with the landlord and will not be able to access the state of the landlord's window.

Table 1 summarizes the window manipulation policies in browser kernel. As described above, because the browser kernel 206 maintains these control policies, they are separate from DOM semantics and implementations. Thus, these policies are more secure and consistently applied.

Browser kernel 206 also ensures that principal instances other than the landlord and the tenant cannot manipulate any of the window states. This includes descendant navigation. A descendant navigation policy allows a landlord to navigate a window created by its tenant even if the landlord and the tenant are different principals. For example, a tenant may have a script interacting with one of its windows which then effects changes to the tenant's backend. In this example, navigating the tenant's window requires just one line of JavaScript®, which could result in undesirable changes in the tenant's backend. Because of the security problems this poses, the browser kernel prohibits descendant navigation. Thus, a landlord frame can only cause navigation in tenants and has no control over frames belonging to other principals.

Cross-Principal Event Protection

Browser kernel 206 captures all events in the system and must accurately dispatch them to the right principal instance to achieve cross-principal event protection. Networking and persistent-state events are easy to dispatch. However, user interface events pose interesting challenges to browser kernel 206 in discerning an event's owner. This is especially difficult when dealing with overlapping and/or potentially transparent cross-domain windows. These transparent cross-domain windows may mix content from different origins along the z axis where content can be occluded, either partially or completely, by cross-domain content. In addition, web pages may render portions of their windows transparent, further blurring the lines between principals. Although these flexible mechanisms have legitimate uses, they can be used to fool users into thinking they are interacting with content from one origin, but are in fact interacting with content from a different origin. For example, recent "user interface (UI) redressing" attacks illustrate some of the difficulties with current standards and how attackers can abuse these mechanisms.

To achieve cross-principal event protection, browser kernel 206 needs to determine the event owner in order to know what principal instance handles the event. Once the principal instance is determined, browser kernel 206 may then dispatch the event to an appropriate destination. There are two types of events: stateless and stateful. The owner of a stateless event such as a mouse event is the tenant of the window (or display area) on which the event takes place. The owner of a stateful event such as a key-press event is the tenant of the current in-focus window. Browser kernel 206 interprets mouse clicks as focus-setting events and keeps track of the current in-focus window and its principal instance.

The key problem to solve then is to determine the window on which a stateless or focus-setting event takes place. It is necessary for this determination to have high fidelity as to when the event owner corresponds to the user intent. Different window layout policies directly affect the fidelity of this determination.

In one implementation, a two dimensional (2-D) display delegation policy may be used. With a 2-D display delegation policy, the browser kernel manages the display as a two-dimensional space for the purposes of delegation. Once a landlord delegates a rectangular area to a tenant, the landlord cannot overdraw the area. Thus, no cross-principal content can be overlaid. Such a layout constraint will enable perfect fidelity in determining event ownership. It also yields much better security as it can prevent all UI redressing attacks except clickjacking.

However, this policy has a significant impact on backward compatibility. For example, a menu from a host page cannot be drawn over a nested cross-domain frame or object. Thus, an opaque transparency policy may be used.

In another implementation, an opaque transparency policy may be used. With the opaque transparency policy, existing display management and layout policies are retained as much as possible for backward compatibility, but have an added layout constraint: browser kernel 206 enforces that no transparent content can be overlaid on top of cross-domain frames or plugins. This opaqueness enables browser kernel 206 to have perfect fidelity in determining event ownership and complete cross-principal event protection. To prevent rendering errors, transparent cross-domain elements may be converted to opaque elements for display.

Another consideration is race condition attacks. In such an attack, a malicious page may predict a user click (based on earlier user behaviors), then expose a screen area just before the click takes place, making the user unintentionally click on the newly exposed screen area. Browser kernel 206 may be used to mitigate this category of attack. Browser kernel 206 may track newly exposed screen areas (such as those caused by window creation, repositioning or resizing). Browser kernel 206 ignores any click events at the newly exposed screen area until the user has had enough time (for example, one second) to see the area. The length of time may be predetermined, or adjusted by the user. This solution mitigates scenarios where users click on a legitimate site (shown by an attacker site) unintentionally.

Process of Isolating Web Page Principals by Origin

Figure 6:
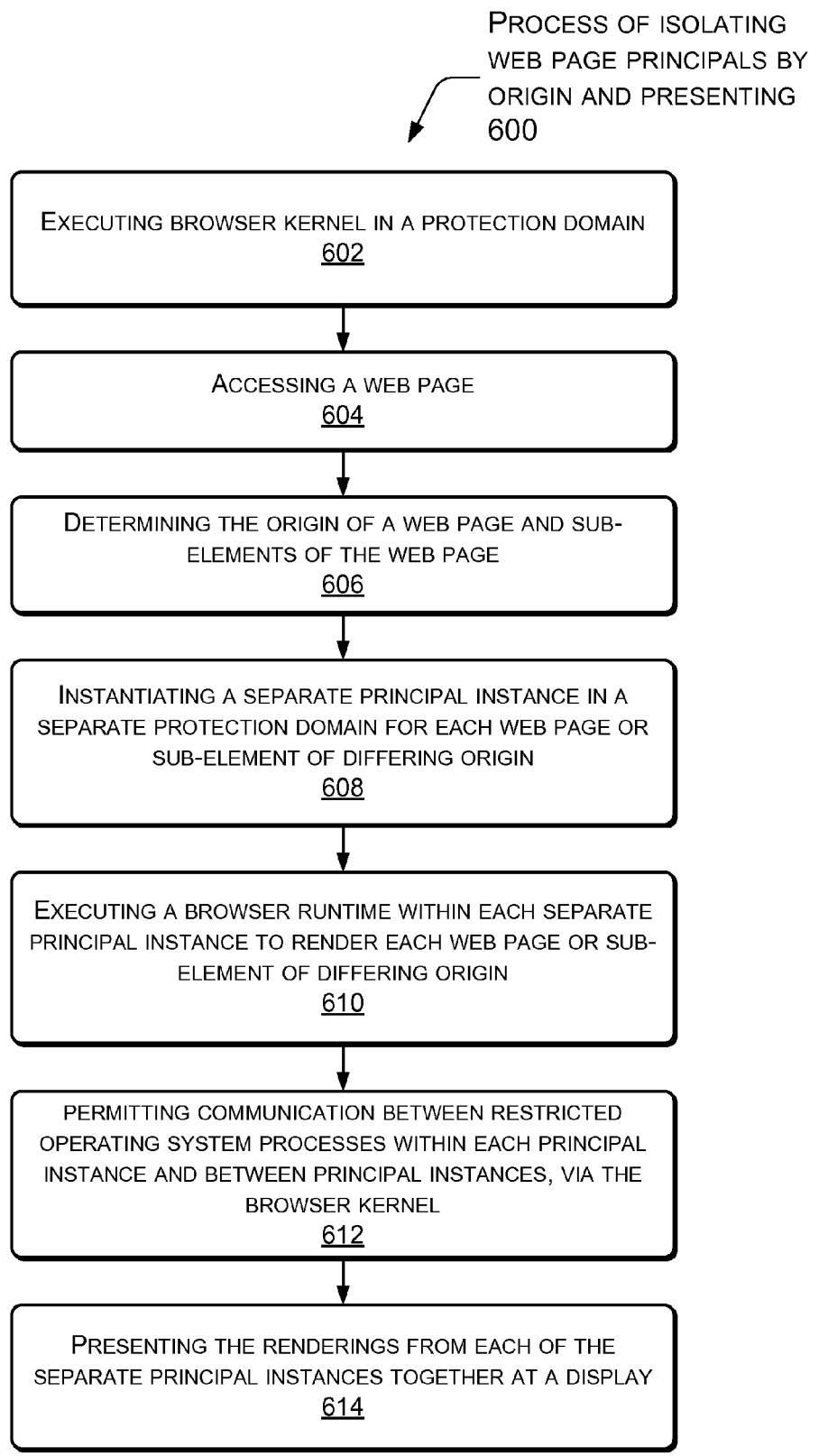
FIG. 6 is an illustrative flow diagram of a process of isolating web page principals by origin and presenting them.

FIG. 6 is an illustrative flow diagram 600 of a process of isolating web page principals by origin and presenting them.

Block 602 executes a browser kernel in a protection domain on a computing device. Block 604 accesses a web page. This access may be a default web page, input by a user, input by an external source, etc.

Block 606 determines the origin tuple of a web page, and any sub-elements of the web page with different origins. Block 608 instantiates a separate principal instance in a separate protection domain for each web page or sub-element of differing origin. In some implementations, this instantiation may include destroying the protection domain of a link host page which spawned the instantiation, and re-allocating and re-initializing a window to the new principal instance.

Block 610 executes a browser runtime within each separate principal instance to render each web page or sub-element of differing origin.

Block 612 permits communication between restricted operating system processes (ROSPs) in each principal instance, as well as between principal instances via the browser kernel. The browser kernel mediates these communications.

Block 614 presents the renderings from each of the separate principal instances together at a display.

FIG. 7 is an illustrative message flow between a browser kernel and principal instances when loading a page with a cross domain iframe. In this figure, time increases down the page, as indicated by arrow 702.

At 704, browser kernel 206 creates a protection domain 208 which includes a principal instance 116. Within principal instance, a first restricted OS process (ROSP) 706 executes. At 708, browser kernel 206 returns content.site.com content to a first browser runtime 710 executing within the ROSP 706 for parsing and rendering. At 712, the browser runtime 710 parses the page, and recognizes the embedded iframe to web page ad.othersite.com, which has a different origin than content.site.com.

At 714, the parsed iframe with a different origin is delegated to browser kernel 206, while rendered content.site.com content is returned to browser kernel 206 for integration and display. At 716, browser kernel 206 creates another protection domain 212 which includes a principal instance 120. Within principal instance 120 a second restricted OS process (ROSP) 718 executes. At 720, browser kernel 206 returns ad.othersite.com content to a browser runtime 722 executing within second ROSP 718 for parsing and rendering. At 724, the browser runtime parses the page. At 726, the rendered ad.othersite.com page is returned to browser kernel 206 for integration and display with content.site.com content.

Conclusion

Although specific details of illustrative processes are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and processes described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. Computer-readable storage device including instructions that are executable by a processor to perform acts comprising:
   executing a browser kernel in a hardware-isolated protection domain;
   accessing a web page comprising first and second elements;
   determining a first origin of the first element and a second origin of the second element, the first and second origin differing;
   instantiating a first principal instance in a first hardware-isolated protection domain for the first element of the web page having the first origin and a second principal instance in a second-hardware protection domain for the second element of the web page having the second origin;
   executing a first browser runtime and a second browser runtime as restricted operating system processes within the first and second principal instances, respectively, to render, respectively, the first element and the second element; and
   presenting renderings from the first and second principal instances together on a display to form the web page.

2. The computer-readable storage device of claim 1, wherein the browser kernel prohibits overlap of elements from the first and second principal instances during the presenting.

3. The computer-readable storage device of claim 1, wherein at least one of the first and second principal instances further comprises a browser plugin executed as a restricted operating system process separate from its corresponding browser runtime restricted operating system process and within its corresponding hardware-isolated protection domain.

4. The computer-readable storage device of claim 3, wherein the browser plugin interacts with an underlying operating system via the browser kernel.

5. The computer-readable storage device of claim 1, further comprising determining that the first and second origins differ by comparing a first protocol, a first domain name, and a first port that correspond to the first element to a second protocol, a second domain name, and a second port that correspond to the second element.

6. The computer-readable storage device of claim 1, wherein the second origin of the second element includes a subdomain of a domain included in the first origin of the first element, and the browser kernel prohibits the second element from setting its origin to the domain of the first element.

7. The computer-readable storage device of claim 1, wherein the browser kernel prohibits rendering of one or more of Hypertext Transfer Protocol transmitted scripts and style sheets of the second element for the first element, upon a determination that the first element is a Hypertext Transfer Protocol Secure principal.

8. The computer-readable storage device of claim 1, wherein the browser kernel prohibits descendant navigation.

9. A method comprising:
   executing a browser kernel;
   determining origins of a plurality of elements on a web page;
   instantiating separate principal instances in separate protection domains for different ones of the plurality of elements of the web page having unique origins;
   executing browser runtimes within the separate principal instances to separately render ones of the plurality of elements of the web page that have differing origins; and
   rendering two or more of the plurality of elements from two or more of the separate principal instances together at a display to form the web page.

10. The method of claim 9, wherein the browser kernel is executed in a protection domain.

11. The method of claim 9, wherein one of the browser runtimes is executed as a restricted operating system process and a plugin is executed as a restricted operating system process in the same principal instance as the one of the browser runtimes.

12. The method of claim 9, further comprising prohibiting, by the browser kernel, presentation one of the elements from one of the principal instances with another element of another one of the principal instances in an overlapping manner.

13. The method of claim 9, wherein one of the separate principal instances further comprises a browser plugin executed within a corresponding one of the separate protection domains as a restricted operating system process that is separate from a corresponding one of the browser runtimes process that is within the corresponding one of the separate protection domains.

14. The method of claim 9, further comprising identifying the unique origins based on unique combinations of protocol, domain name, and port amongst the plurality of elements.

15. The method of claim 14, wherein a first one of the unique origins includes a domain, and a second one of the unique origins includes a subdomain of the domain.

16. The method of claim 9, wherein the browser kernel prohibits rendering one or more of Hypertext Transfer Protocol transmitted scripts and style sheets of a second element for a first element upon a determination that the first element is a Hypertext Transfer Protocol Secure principal.

17. The method of claim 9, wherein the browser kernel prohibits descendant navigation.

18. A system for securely browsing multiple origin web pages, the system comprising:
   a processor;
   memory coupled to the processor; and
   a browser kernel stored on the memory and executable by the processor to:
      determine unique origins for a plurality of elements of a web page;
      execute a first browser runtime and a second browser runtime as restricted operating system processes within first and second principal instances, respectively, to separately render a first element of the plurality of elements of the web page having a first origin and a second element of the plurality of elements of the web page having a second origin;
      combine the first element and the second element to render the web page; and
   a display coupled to the processor, and configured to display the rendered web page.

19. The system of claim 18, wherein the browser kernel is further executable to provide a plugin within the restricted operating system process of the second principal instance.

20. The system of claim 18, wherein the browser kernel is further executable to identify the unique origins based on unique combinations of protocol, domain name, and port, wherein a domain and subdomain of the domain are treated as different domain names.

* * * * *